United States Patent [19]
Ko et al.

[11] Patent Number: 6,074,290
[45] Date of Patent: *Jun. 13, 2000

[54] COMPLIANT LENS BLOCK AND TAPE

[75] Inventors: John H. Ko, Woodbury; James A. Weldon, Eagan, both of Minn.

[73] Assignee: Minnesota Mining and Manufacturing Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,492

[22] Filed: Jan. 28, 1997

Related U.S. Application Data

[62] Division of application No. 08/330,809, Oct. 28, 1994, abandoned.

[51] Int. Cl.$^7$ .................................................. B24B 41/06
[52] U.S. Cl. ......................... 451/390; 451/255; 451/256; 451/325
[58] Field of Search ................................ 451/42, 43, 240, 451/255, 256, 277, 323, 325, 390

[56] References Cited

U.S. PATENT DOCUMENTS

| | | |
|---|---|---|
| Re. 31,897 | 5/1985 | Johnson . |
| 2,607,711 | 8/1952 | Hendricks . |
| 2,752,738 | 7/1956 | Seifert . |
| 3,109,696 | 11/1963 | Whitney . |
| 3,123,954 | 3/1964 | Calkins . |
| 3,339,318 | 9/1967 | Graf et al. . |
| 3,490,182 | 1/1970 | Lanman ................................. 451/390 |

(List continued on next page.)

FOREIGN PATENT DOCUMENTS

WO 94/02286  2/1994  WIPO .

OTHER PUBLICATIONS

Patent Abstracts of Japan, vol. 13, No. 258, Jun. 15, 1989 and JP 1064772.

*Primary Examiner*—Timothy V. Eley
*Attorney, Agent, or Firm*—F. Andrew Ubel

[57] ABSTRACT

The present invention provides a block assembly for mounting an optical lens blank onto a lens processing machine, comprising a compliant lens block with a relatively thin double-sided adhesive tape having differential adhesion. This assembly affords a very cost efficient system for attaching a lens blank to a lens processing machine. In contrast to traditional thick adhesive pads, the tapes of the present invention do not suffer from shear displacements which may cause processing errors or inaccuracies. In addition, the double-sided adhesive tapes of the present invention achieve greater adhesion to the lens block than to the lens. This feature promotes and ensures a "clean" removal of the tape from the lens when the block is deblocked. The present invention also provides a method for mounting an optical lens blank onto a lens processing machine. This method comprises the steps of: disposing a compliant block assembly in close proximity to an optical lens blank (the block assembly comprising a base structure having a compliant receiving surface adapted to conform to a surface on an optical lens blank to be processed in a lens processing machine and a mounting means for mounting the block onto a chuck of a lens processing machine, wherein at least a portion of said compliant receiving surface is covered with a thin double-sided adhesive tape having differential adhesion); adhesively attaching the optical lens blank to the compliant block by applying the block to the optical lens blank with sufficient pressure to conform the receiving surface to the surface of the optical lens blank while the adhesive tape joins the block and optical lens blank together; and mounting the block and the adhesive tape joined optical lens blank onto the lens processing machine.

20 Claims, 3 Drawing Sheets

U.S. PATENT DOCUMENTS

| | | |
|---|---|---|
| 3,865,770 | 2/1975 | Blake . |
| 3,921,344 | 11/1975 | Goodwin . |
| 3,962,833 | 6/1976 | Johnson ............................ 451/390 X |
| 4,158,273 | 6/1979 | Olsen et al. ...................... 451/390 X |
| 4,221,083 | 9/1980 | Carroll . |
| 4,287,013 | 9/1981 | Ronning . |
| 4,330,203 | 5/1982 | Oppenheim et al. . |
| 4,413,080 | 11/1983 | Blake . |
| 4,554,193 | 11/1985 | Erickson . |
| 4,569,960 | 2/1986 | Blake . |
| 4,699,842 | 10/1987 | Jorgensen et al. . |
| 4,895,738 | 1/1990 | Zimmerman et al. . |
| 4,925,518 | 5/1990 | Wasserman et al. . |
| 4,948,645 | 8/1990 | Holzinger et al. . |
| 4,969,273 | 11/1990 | Richards . |
| 4,988,742 | 1/1991 | Moon et al. . |
| 5,019,071 | 5/1991 | Bany et al. . |
| 5,125,995 | 6/1992 | D'Haese et al. . |
| 5,158,557 | 10/1992 | Noreen et al. . |
| 5,176,939 | 1/1993 | Shepherd . |
| 5,260,118 | 11/1993 | Lussi et al. . |
| 5,270,111 | 12/1993 | D'Haese et al. . |
| 5,380,387 | 1/1995 | Salamon et al. .................... 451/390 X |
| 5,397,614 | 3/1995 | Patnode et al. . |
| 5,462,475 | 10/1995 | Kennedy ............................ 451/390 X |
| 5,474,489 | 12/1995 | Vernon ............................... 451/390 X |

COMPLIANT LENS BLOCK AND TAPE

This is a division of application Ser. No. 08/330,809 filed Oct. 28, 1994 which is now abandoned.

FIELD OF THE INVENTION

The present invention relates to compliant lens blocks which employ a double-sided pressure sensitive adhesive tape to attach the compliant block to a lens blank. More particularly, the invention relates to double-sided adhesive tapes which adhere more tenaciously to the surface of a compliant lens block than to an optical lens blank. The invention also relates to methods for attaching optical lens blanks to a lens block.

BACKGROUND OF THE INVENTION

A number of different methods have been used to hold a lens in place during the surfacing or finishing process. One method commonly used at present makes use of a low-melting-temperature alloy to form or attach a "block" to a lens. The block is adapted to be held by the surfacing or finishing machine. One common low-melting-point alloy contains a mixture of bismuth, tin, lead, cadmium, indium, and antimony. When these materials are combined correctly, the alloy melts at a temperature considerably lower than any one of its component elements would melt by itself (thus, neither causing plastic lenses to melt nor glass lenses to crack). For example, one alloy suitable for use with either plastic or glass lenses melts at 47° C. and is made from the following combination of metals: 45% bismuth; 23% lead; 8% tin; 5% cadmium; and 19% indium. If desired, a single-sided adhesive tape or other lens coating may be used to achieve better alloy adherence (e.g., the non-adhesive surface of the adhesive tape may provide a more favorable surface for the alloy to adhere to than the uncoated lens surface). Blockers that use metal alloy either inject molten alloy between the semifinished lens and the block, or mold a block fully and completely from the alloy material. Both types of blockers have a melting pot that is thermostatically regulated, and a heated feeding tube. Ideally, for plastic lenses, the alloy temperature is kept just above its melting point until it fills in the area between the lens and lens block. For example, the 47° C. alloy used for plastic, polycarbonate and polyurethane lenses should preferably be kept at 52° C., or even lower if possible. For plastic lenses, the alloy is preferably cooled as rapidly as possible so that plastic lenses will not form surface indentations. For glass lenses the alloy temperature may be maintained at higher temperatures (e.g., 74–77° C.).

An alternative approach to blocking lenses is disclosed in U.S. Reissue Pat. No. 31,897 by Johnson and involves the use of a relatively thick (approximately 0.8 mm) double-sided adhesive blocking pad which is disposed between the lens and a block. The intermediate pad serves to provide a flexible interface between the lens blank and the rigid block, which is said to permit firm bonding even when the curvatures of the lens blank and the rigid block do not match. Unfortunately, relatively thick adhesive pads of this type are often quite expensive and may be prone to shear displacement during the lens processing operation. This shear displacement (up to approximately 2° to 10°) can contribute to inaccuracies and errors in the prescription of the lens.

A compliant lens block is described in U.S. Pat. No. 4,925,518 (Wasserman et al.). The compliant lens block is described as being attached to the lens blank, for example, using either a pre-applied adhesive coating or a thick double-sided foam adhesive pad. Unfortunately, blocks which are precoated with adhesive can suffer from the problem of adhesive transfer to the lens upon removal of the lens from the block. This necessitates cleaning of the lens to remove the transferred adhesive (e.g., using solvents or detergents). Also unfortunately, thick double-sided foam adhesive pads suffer from the previously mentioned disadvantages of expense and shear displacement. In addition, thick double-sided foam adhesive pads oftentimes tend to remain attached to the lens blank upon deblocking. This necessitates an extra step of removing the foam pad from the lens blank. Alternatively, U.S. Pat. No. 4,925,518 discloses a one-sided, pressure-sensitive sheet material which is affixed to the block structure by application of a heat sensitive glue or curing agent. This process is expected to be quite expensive given the separate bonding step which is contemplated.

SUMMARY OF THE INVENTION

We have discovered that a combination of a compliant lens block with a relatively thin double-sided adhesive tape having differential adhesion affords a very cost efficient system for attaching a lens block to a lens processing machine. In contrast to traditional thicker adhesive pads, the tapes of the present invention do not suffer from shear displacements which may cause processing errors or inaccuracies. In addition, the double-sided adhesive tapes of the present invention achieve greater adhesion to the lens block than to the lens. This feature promotes and ensures a "clean" removal of the tape from the lens when the block is "deblocked" (i.e., after removal from the machine the lens may be easily and cleanly separated from the tape which remains attached to the block).

The present invention also provides a method for mounting an optical lens blank onto a lens processing machine. This method comprises the steps of: disposing a compliant block assembly in close proximity to an optical lens blank (the block comprising a base structure having a compliant receiving surface adapted to conform to a surface on an optical lens blank to be processed in a lens processing machine and a mounting means for mounting the block onto a chuck of a lens processing machine, wherein at least a portion of said compliant receiving surface is covered with a thin double-sided adhesive tape having differential adhesion); adhesively attaching the optical lens blank to the compliant block by applying the block to the optical lens blank with sufficient pressure to conform the receiving surface to the surface of the optical lens blank while the adhesive tape joins the block and optical lens blank together; and mounting the block and the adhesive tape joined optical lens blank onto the lens processing machine.

BRIEF DESCRIPTION OF THE DRAWINGS

This invention will be better understood when taken in conjunction with the drawings wherein.

This invention utilizes certain principles and/or concepts as are set forth in the claims appended to this specification. Those skilled in the lens processing arts to which this invention pertains will realize that these principles and/or concepts are capable of being illustrated in a variety of embodiments which may differ from the exact embodiments utilized for illustrative purposes in this specification. For these reasons, the invention described in this specification is not to be construed as being limited to only the illustrative embodiments but is only to be construed in view of the appended claims.

DETAILED DESCRIPTION OF THE INVENTION

A lens block having a compliant structure adapted to receive and hold a lens blank or similar optical element is disclosed. The flexibility of the block itself ensures that the optical element can be held without breakage during the various shaping operations, such as grinding, edging, and polishing, encountered in preparing a lens for mounting in an eyeglass frame or similar receptacle. In one preferred embodiment, the block is a disposable element carrying a double-sided adhesive tape material for simple application to a lens blank.

In one illustrated embodiment, a compliant lens block is formed having a dish-shaped receiving surface on one side for receiving the lens blank and an appropriate key structure on the other side for mounting into the chuck of a grinding lathe, edger or other lens shaping machine. The lens-receiving surface is compliant and, therefore, can conform to the lens blank, regardless of the curvature of the blank. Preferably, the compliant lens-receiving surface can conform to the lens blank regardless of any surface discontinuities (e.g., bifocal and trifocal lens structures) of the blank. The block also preferably includes a key structure, disposed on the opposite side of the block from the lens-receiving surface, for mounting the adhesive-tape-joined lens blank to a shaping machine. The key structure can follow any one of a number of conventional designs so as to mate either directly or via an adaptor to the chuck assembly on a commercially available shaping machine. The block can further include alignment means for aligning the block with the center point of the lens blank and, optionally, a cylindrical axis of the blank as well. In one embodiment, a central hole is provided in the block for visually aligning the center of the block with the center point of the lens blank, and a set of markers on two diametrically opposed slots are provided for visual or photometric alignment of the block with the cylindrical axis of the optical element. Preferably, the double-sided adhesive tape used to attach the lens blank to the compliant block is optically transparent so as to facilitate the visual or photometric alignment. Alternatively, the double-sided adhesive tape may be provided with a hole or aperture therethrough to enable the visual or photometric alignment.

Surprisingly, the compliant design of the block permits the use of a single block shape to fit most all lenses while eliminating the need for intermediate pads. Additionally, the blocks provide sufficient flexibility to prevent lens breakage while retaining the stiff, torsional rigidity necessary to block the optical element during shaping operations. Moreover, the blocks of the present invention can be mass produced at high speed (e.g., by plastic molding techniques) followed by adhesive tape application in an automatic mode. The finished blocks are particularly suitable for mechanized handling to support automated, as well as manual block operations.

Suitable adhesive tapes for use in the present invention are relatively thin and preferably comprise a backing or support layer which is coated on both major surfaces with a pressure sensitive adhesive. The adhesive surfaces are preferably covered prior to use with a release liner or liners. Alternatively, the adhesive tape may comprise a relatively thin, single layer of a pressure sensitive adhesive material (e.g., disposed prior to use between two release liner materials). In contrast, most conventional blocking techniques employ a relatively thick, double-sided foam tape in combination with a rigid metal block. The foam tape is provided as a relatively thick pad and accommodates curvature differences between the block and the lens blank. Surprisingly, this invention reveals that certain relatively thin, double-sided adhesive tapes work well when used in conjunction with a compliant lens block. The thinner tapes afford less shear displacement than conventional thicker foam tape pads. Shear displacement may be measured by mounting a 50.8 mm radius lens blank to a lens block and applying a 2.73 kg force tangentially at the edge of the lens while firmly holding the block in a fixed position. Preferred tapes exhibit shear displacement when tested in this manner of less than 5°, more preferably less 2°, and most preferably less than 1°. In addition, the thinner tapes are less expensive to produce. Suitable double-sided adhesive tapes have a combined thickness (e.g., including the backing and adhesive layers) of less than about 0.38 mm. Preferred double-sided adhesive tapes have a combined thickness of less than about 0.25 mm, more preferably less than about 0.13 mm. Most preferably, the double-sided adhesive tapes have a combined thickness of less than about 0.08 mm.

A preferred feature of the tapes of the present invention is their ability to adhere more tenaciously to the lens block than to the lens itself. This property is referred to as "differential adhesion." This feature is especially desired on thin tapes as these tapes are considerably more difficult to peel off from a lens blank (e.g., by hand) than a thicker foam pad. Differential adhesion may be achieved in a variety of different ways. For example, in a first embodiment of the present invention the double-sided adhesive tape comprises two different adhesives. A first adhesive is formulated to provide a first adhesive peel strength (as herein described) to the lens block while a second, different adhesive is formulated to provide a second, lower adhesive peel strength to the lens. In a second embodiment the double-sided adhesive tape comprises a single adhesive formulation which is coated at different weights or patterns on each side of a backing. By varying the adhesive coating weight or pattern the adhesive peel strength may be adjusted so as to provide the desired differential adhesion. In yet another embodiment, the double-sided tape comprises an adhesive formulation which itself provides different adhesive peel strength to the two different surfaces (e.g., the adhesive formulation has different affinity to the lens block surface material and to the lens surface itself). Combinations of these techniques may be employed if desired. For example, one might employ an adhesive which itself provides some amount of differential adhesion in combination with the aforementioned coating weight or pattern technique. Alternatively, e.g., one might employ two separate adhesives in combination with the aforementioned coating weight or pattern technique.

Suitable tapes provide a peel strength to the lens of at least 0.11 N/mm width when tested as herein described. Preferred tapes provide a peel strength to the lens of at least 0.13 N/mm width, more preferably at least 0.15 N/mm width, and most preferably at least 0.16 N/mm width. As previously mentioned, the double-sided adhesive tape should preferably adhere more tenaciously to the lens block than to the lens itself. Preferred tapes provide a differential adhesion ratio (i.e., the ratio of the tape's peel strength to the block over the tape's peel strength to the lens) of at least 1.5. Therefore, preferred tapes provide a peel strength to the lens block of at least 0.132 N/mm (i.e., 1.2 times 0.11 N/mm). More preferably, the differential adhesion ratio is at least 1.75, most preferably the differential adhesion ratio is at least 2.

Suitable adhesives for use in the present invention include those pressure sensitive adhesives which are capable of providing the necessary amount of peel strength and/or shear strength to function in the manner required (e.g., sufficient strength to attach securely the lens block to the lens blank without unintended detachment). Preferred adhesives should be non-toxic, more preferably hypoallergenic, and are most preferably also environmentally safe.

Suitable pressure sensitive acrylate adhesives for use in the present invention include, for example, copolymers which are reaction products of the polymerization of at least one "A" monomer and at least one "B" monomer to yield a copolymer having an inherent viscosity of about 1.0 dl/g to about 2.0 dl/g. The A monomer is a polymerizable monomer comprising an acrylate or methacrylate ester of a non-tertiary alcohol or a mixture of non-tertiary alcohols with the alcohols having from 1 to 14 carbon atoms and desirably averaging about 4 to 12 carbon atoms. The B monomer is an ethylenically unsaturated compound and desirably may be acrylic acid, methacrylic acid, itaconic acid, acrylamide, methacrylamide, acrylonitrile, methacrylonitrile, vinyl acetate, N-vinyl pyrrolidone, or combinations thereof. The A monomer is polymerizable and contributes the viscoelastic properties of the pressure sensitive adhesive copolymer. Non-limiting examples of such A monomers include the esters of acrylic acid or methacrylic acid with non-tertiary alkyl alcohol such as 1-butanol, 1-pentanol, 2-pentanol, 3-pentanol, 2-methyl-1-butanol, 1-methyl-1-butanol, 1-methyl-1-pentanol, 2-methyl-1-pentanol, 3methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like. Such monomeric acrylic or methacrylic esters are known in the art, and many are commercially available. The B monomer is an ethylenically unsaturated compound copolymerized with the A monomer to affect the physical properties of the resulting pressure sensitive adhesive copolymer. In general, the presence of the B monomer will reduce the flexibility of the resulting pressure sensitive adhesive copolymer. Thus, the weight percentages of the A monomer and the B monomer should be balanced in order to provide a pressure sensitive adhesive copolymer having an inherent viscosity of from about 1.0 dl/g to about 2.0 dl/g. The weight percentage ratio of A monomer: B monomer ranges from about 85:15 to about 98:2 and desirably from about 90:10 to 97:3. Alternate pressure sensitive adhesives useful in the present invention include, for example, hypoallergenic Kraton rubber-based pressure sensitive adhesives produced using styrene-butadiene or styrene-isoprene copolymers commercially available as Kraton branded copolymers from Shell Oil Company of Houston, Tex. A variety of Kraton based pressure sensitive adhesives are disclosed in U.S. Pat. Nos. 5,019,071 (Bany et al.) and 5,158,557 (Noreen et al.), the disclosures of which are incorporated by reference herein. Additional alternate pressure sensitive adhesives useful in the present invention include, for example, the water-dispersible pressure sensitive adhesives disclosed in U.S. Pat. Nos. 3,865,770; 4,413,080; 4,569,960; 5,125,995; and 5,270,111 and in 5,380,779, 5,460,880 and 5,518,763 the disclosures of which are herein incorporated by reference.

The pressure sensitive adhesive copolymer should be tacky at 21° C. Also, the adhesive should be preferably hypoallergenic, i.e., after continuous contact with skin, there is no significant skin sensitization or irritation during adhesion. The pressure sensitive adhesive may also have a tackifier added to the formulation to improve tack. Commercially available tackifiers include, for example, "Foral" branded colophony acid rosins, such as "Foral AX" and "Foral 85" rosins, commercially available from Hercules Corporation, and partially hydrogenated methylstyrene hydrocarbon resins, such as "Piccolastic A25" resin, also commercially available from Hercules Corporation.

Preferred adhesive tapes for use in the present invention comprise a backing or support layer which is coated on both major surfaces with a pressure sensitive adhesive. Suitable backings for use in the present invention include sheet materials or laminates comprising paper, fabric, thin foam materials or plastic sheet materials. Presently preferred backing materials include plastic sheet materials. Suitable plastic sheet materials include naturally based organic polymers such as acetate, azlon, rayon, and triacetate; and synthetically prepared organic polymers such as acrylic, aramid, nylon, olefin, poly(1-butene), polycarbonate, polyethylene, polyester, poly(3-methyl-1-butene), poly(1-pentene), polypropylene, polystyrene, polysulfone, polytetrafluoroethylene, polyurethane, poly(vinyl acetate), poly(vinyl alcohol), poly(vinyl chloride), poly(vinylidine chloride), and poly(vinylidine fluoride) and copolymers of the above including polyethylene-vinyl acetate. Preferred backing materials include cellulose acetate, paper, polyethylene, polyester, polypropylene, polyurethane, poly(vinyl acetate), poly(vinyl alcohol), poly(vinyl chloride). More preferred backing materials include polyethylene, polyester, polypropylene, polyurethane, poly(vinyl acetate), and poly(vinyl alcohol). Preferred materials are nontoxic, more preferably hypoallergenic, and are most preferably also environmentally safe (e.g., may be recycled or disposed of in a manner which does not harm the ecosystem). If desired, the backing material may comprise a laminate of more than one material. For example, a first material may be bonded, coated or secured to a different second material. The first material may provide the laminate with the necessary compatibility with the pressure sensitive adhesive while the second material may provide the laminate with the necessary physical integrity or strength.

The adhesive should be coated on or into the backing in an amount {expressed as an average adhesive coating weight (g) per meter square ($m^2$) of the backing} which will provide the tape with the necessary adhesive strength to function in the manner intended (e.g., sufficient strength to attach securely the lens blank to the lens block without unintended detachment during shaping or other processing). Preferred coating weight of adhesive on the backing is between 3 and 80 g/$m^2$. More preferred coating weight of adhesive on the backing is between 7 and 50 g/$m^2$. Most preferred coating weight of adhesive on the backing is between 7 and 35 g/$m^2$. If desired, the adhesive may be coated on the backing as a continuous layer or as a discontinuous layer or pattern (e.g., dots, stripes, etc.).

The exposed adhesive surface of the tape is preferably covered prior to use with a suitable protective cover sheet or "liner." Suitable liners include any material which adequately covers the adhesive (thus preventing contamination of the adhesive tack) and which can be easily peeled apart from the adhesive. Preferred liners have a low adhesion coating (such as a silicone treated polyethylene coating) which facilitates the easy peeling apart of the liner. The tape may be preapplied to the lens block (thus having one adhesive surface that is preferably covered by a liner) or may be provided as a separate component which is applied by the user to the block or blank (thus having two adhesive surfaces that are preferably covered by a liner).

Suitable compliant blocks are prepared using materials which provide the block with the necessary rigidity to hold the lens blank securely in alignment during processing. The block can be stamped from a metal such as steel or molded using a thermoplastic material. Preferably, the block is injection molded using a thermoplastic material. Preferred thermoplastic materials for use in the fabrication of the block include polyethylene, polypropylene, poly(vinyl chloride), high impact polyethylene, high impact polypropylene, block copolymers of styrene-ethylene/butylene-styrene (such as Kraton™ G-7820), copolymers of polyethylene and methacrylic acid (such as Surlyn™ 1702 and 9450), etc. More preferred block materials contain thermoplastic materials that have a high affinity for the pressure sensitive adhesive. The selection of materials with such an affinity helps retain the tape against the block after deblocking. More preferred thermoplastic materials for use in the fabrication of the block include high impact polyethylene, high impact polypropylene, block copolymers of styrene-ethylene/butylene-styrene (such as Kraton™ G-7820), and copolymers of polyethylene and methacrylic acid (such as Surlyn™ 1702 and 9450). Presently most preferred thermoplastic materials for use in the fabrication of the block include block copolymers of styrene-ethylene/butylene-styrene (such as Kraton™ G-7820), and copolymers of polyethylene and methacrylic acid (such as Surlyn™ 1702 and 9450).

DETAILED DESCRIPTION OF THE DRAWINGS

Reference is made to the attached figures wherein like parts have been given like index numbers. Throughout the drawings the various layers of backing, adhesive, or liner material have been exaggerated in thickness for purposes of illustration and clarity. In particular, for example, the adhesive layer is shown in exaggerated thickness. In addition, the size of the various components may be modified, if desired, to accommodate the particular needs of the particular lens blank, lens block, or shaping machine. The invention will next be described in connection with certain illustrated embodiments; however, it should be clear that various additions, subtractions and modifications can be made without departing from the spirit or scope of the inventing.

Figure 1:
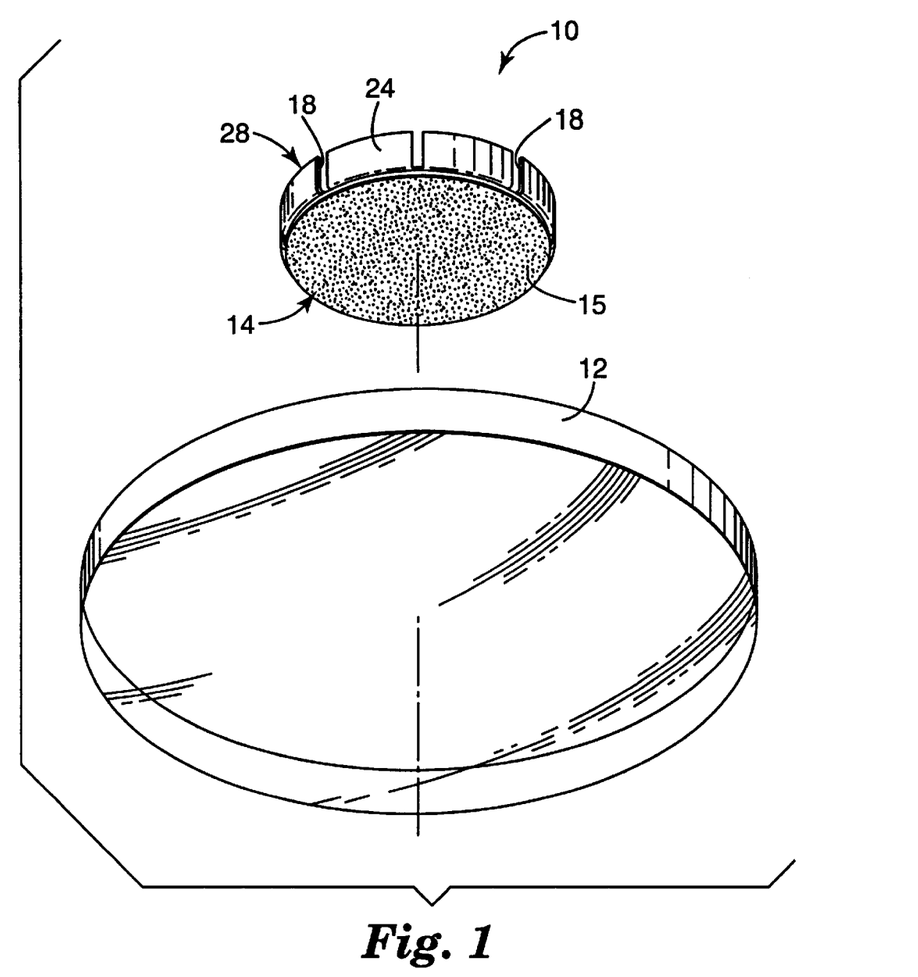
FIG. 1 is a perspective view of a compliant lens block and adhesive tape in accordance with the invention.
Figure 2:
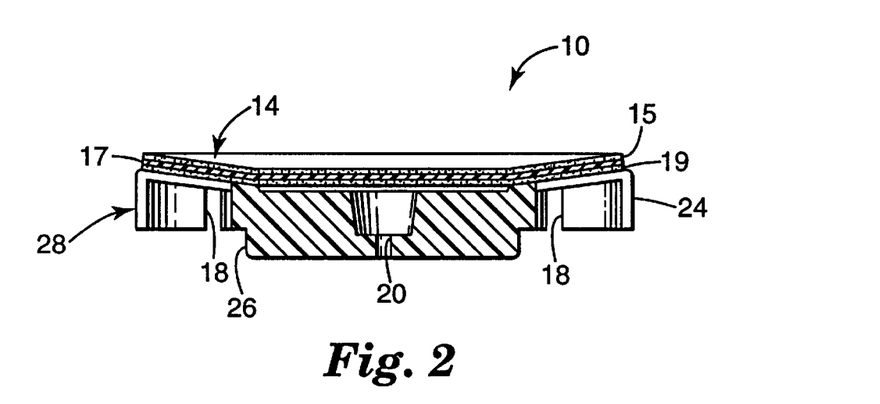
FIG. 2 is a cross-sectional view of the lens block and adhesive tape of FIG. 1.
Figure 3:
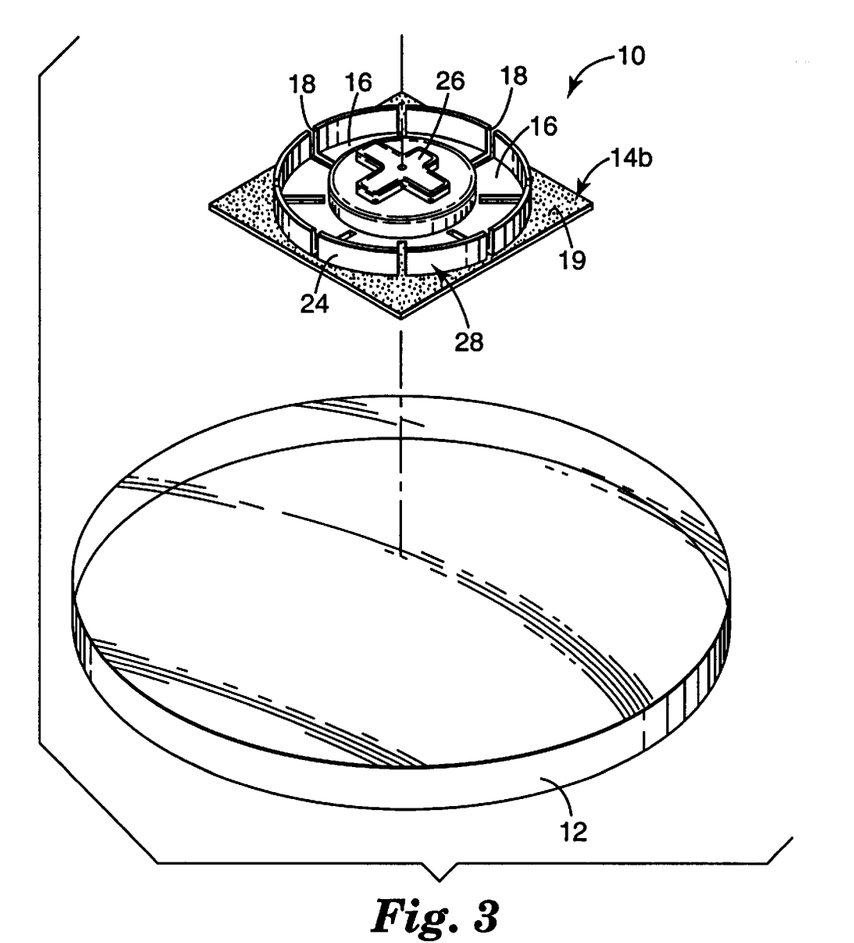
FIG. 3 is a perspective view of another embodiment of a lens block and adhesive tape according to the invention.

In FIG. 1, a compliant block 10 is shown disposed above a lens blank 12. As shown in FIG. 1 and further illustrated in FIGS. 24, block 10 includes a double-sided pressure sensitive adhesive tape 14 (e.g., comprising adhesive surface 15, backing 17, and higher peel strength adhesive surface 19) and optionally a plurality of flexible lands 16, separated from each other by a slot 18. The block 10 may further include a central alignment hole 20 and peripheral axis alignment markers. The block 10 can also include flanges 24 to provide additional structural and torsional rigidity. With reference to FIG. 3, the raised key structure 26 is shown for mounting the block 10 to the chuck assembly (not shown) of a shaping machine.

The base structure of the block 10 can be made as a draw stamping from a metal, such as steel or from a molded plastic such as high impact polyethylene, polypropylene or the like. A protective cover sheet (not shown), such as silicone-coated paper, can be disposed over the adhesive surface 15 of the adhesive tape 14 until the block 10 is ready for use. Notably, the adhesive tape may be die cut to a shape which roughly matches the overall shape of the block (as shown in FIG. 1) or may be cut in another shape which extends past or overlaps the block (e.g., as shown in FIG. 3 as 14b). The adhesive tape may also be die cut so as to have a hole or aperture therethrough.

The lens block 10 is employed as shown schematically in FIG. 1. The protective cover sheet (if any) is removed, and the block 10 is aligned with the lens blank 12. The optional alignment means of the present invention are particularly well-suited for visual or photometric alignment with an illumination means which transmits light through center hole 20 and any optional axial markers. Such alignment of the light sources with predefined marks on the lens blank permits simple orientation of the blank with respect to the block. Upon alignment, the two elements are pressed together, bending the flexible lands 16 of the block 10 to conform the surface of the blank 12 and securing the block 10 and blank 12 to each other by action of the double-sided adhesive tape 14. Conventionally, the blocking operations are performed with the assistance of blocking machines, such as the Briot Blocker, manufactured by Universal Photonics, Inc. (Hicksville, N.Y.), or similar systems manufactured by others.

Figure 4:
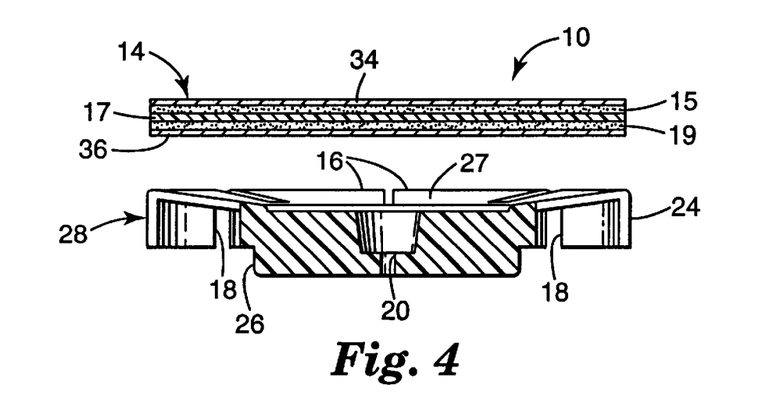
FIG. 4 is a cross-sectional view of the lens block and adhesive tape of FIG. 3.

As shown in FIG. 4, the pressure-sensitive tape 14 may include upper and lower protective release liners 34, 36. A first liner 36 is removed to secure the tape to the block. The second liner is removed as described above when securing the block to a blank. As also illustrated in FIG. 4, block 10 can be fabricated by removing lower release liner 36 of tape 14 and joining the exposed adhesive surface of the tape to the compliant surface 27 of base structure 28. Alternatively (not shown), the tape may be provided as a roll having a release liner which separates adjacent layers of the roll of tape. When unwound the liner would remain attached to one surface of the tape, thereby exposing one adhesive surface. The tape would be cut and applied to the lens blank as previously described.

Figure 5A:
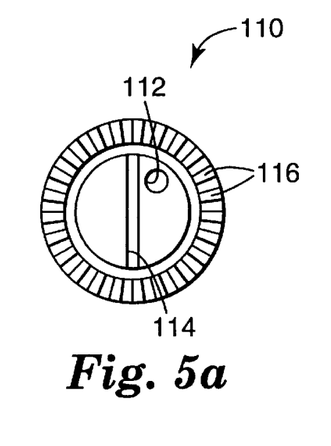
FIGS. 5a–c and 6a–c illustrate further embodiments of alternative lens block and adhesive tape assemblies according to the invention.
Figure 5B:
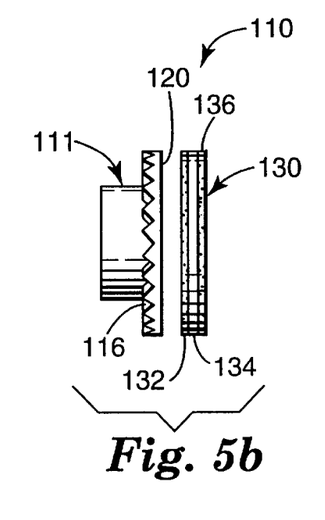
Figure 5C:
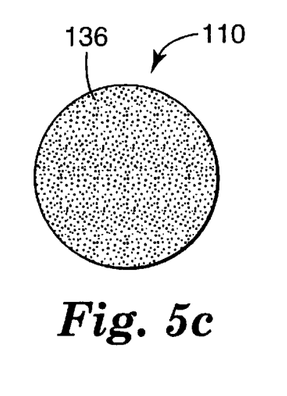
Figure 6A:
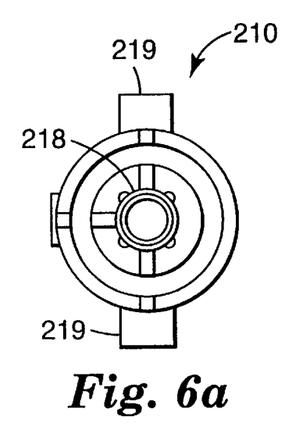
Figure 6B:
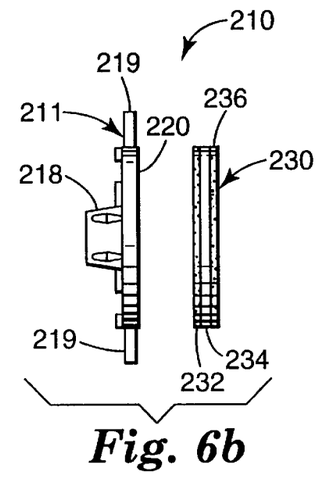
Figure 6C:
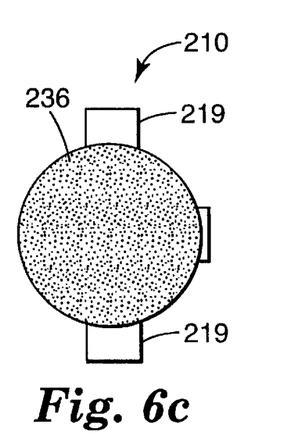

FIGS. 5a–c and 6a–c illustrate alternative embodiments of compliant blocks (110 and 210). As shown in FIG. 5b, compliant block 110 includes a double-sided pressure sensitive adhesive tape 130 affixed to compliant surface 120 of base structure 111 (notably, adhesive tape 130 and base structure 111 are shown apart for illustration purposes). Adhesive tape 130 comprises adhesive surface 136, backing 134, and higher peel strength adhesive surface 132. Base structure 111 has a plurality of notches 116 for engaging the chuck assembly of a shaping machine. As shown in FIG. 5a, key structures 114 and 112 are shown for mounting and aligning the block to the chuck assembly. As shown in FIG. 6b, compliant block 210 includes a double-sided pressure sensitive adhesive tape 230 affixed to compliant surface 220 of base structure 211 (notably, adhesive tape 230 and base structure 211 are shown apart for illustration purposes). Adhesive tape 230 comprises adhesive surface 236, backing 234, and higher peel strength adhesive surface 232. Base structure 211 comprises a raised key structure 218 for engaging the chuck assembly of a shaping machine. Tabs 219 facilitate removal of the block from the lens blank.

The following examples are offered to aid in the understanding of the present invention and are not to be construed as limiting the scope thereof. Unless otherwise indicated, all parts and percentages are by weight.

EXAMPLES

Example 1

Compliant lens blocks were injection molded from a thermoplastic elastomer made of a block copolymer of styrene-ethylene/butylene-styrene (commercially available as "Kraton™ G 7820" from Shell Chemical Company, Houston, Tex.), at a temperature of approximately 200° C.

In Run 1, a differential acrylic adhesive tape (commercially available as "Scotch™ brand Differential tack, 9425, 0.14 mm High-Tack/Medium-Tack double coated film tape" from 3M Company, St. Paul, Minn.) was applied so that the high peel strength side was attached to the lens block prepared as described above and the low peel strength side was attached to four types of lenses: glass; allyl diglycol carbonate thermoset commercially available as "CR-39" from Pittsburgh Paint and Glass, Inc., Pittsburgh, Pa.; polycarbonate; and "Supersin™ antireflective coated lenses" from Weco Optik Maschinen, Dusseldorf, Germany.

In Run 2, a double coated tape and an adhesive transfer tape were laminated to each other to make a differential adhesive tape. The high peel strength side of the laminate comprises an adhesive transfer tape (commercially available as "950, 0.13 mm thick Adhesive Transfer Tape" from 3M Company). This side was attached to the lens block prepared as described above. The low peel strength side of the laminate comprised a double coated tape (commercially available as "#9874 Transparent Polyethylene, 0.122 mm Double Coated Medical Tape" from 3M Company). This side was attached to the same four types of lenses described in Run 1.

In Run 3, a single-sided adhesive coated tape was prepared by knife coating an acrylic emulsion polymer (commercially available as "Aroset™ 2550-W-51" from Ashland Chemical, Inc., Columbus, Ohio), on a 0.1 mm polyethyleneterephthalate (PET) film and drying first by air at 21° C. until clear followed by drying in an oven at 95° C. for 2 minutes. The non-adhesive backside of this single-sided adhesive coated tape was laminated to the adhesive transfer tape described in Run 2 to make a differential adhesive tape. The high peel strength side (comprising the adhesive transfer tape described in Run 2) was attached to the lens block prepared as described above. The low peel strength side comprising the adhesive surface of the single-sided coated tape was attached to the same four types of lenses described in Run 1.

In Run 4, a double coated tape was prepared by knife coating one side of a 0.1 mm PET film with the acrylic emulsion polymer described in Run 3 and knife coating the other side of the PET film with a self-crosslinking acrylic solution (commercially available as "Aroset™ 1920-Z-52" from Ashland Chemical, Inc.). The high peel strength side (comprising the acrylic solution adhesive) was attached to the lens block prepared as described above and the low peel strength side (comprising the acrylic emulsion polymer adhesive) was attached to the four types of lenses described in Run 1.

In Run 5, the double coated tape described in Run 2 was attached with one side to the lens block prepared as described above and with the other side to the four types of lenses described in Run 1.

In Run 6, a differential acrylic adhesive tape (commercially available as "Scotch™ brand Differential Tack, #665, linerless, 0.09 mm differential adhesive double coated film tape" from 3M Company, St. Paul, Minn.) was applied so that the high peel strength side was attached to the lens block prepared as described above and the low peel strength side was attached to the same four types of lenses described in Run 1.

In Run 7, a double coated tape (commercially available as "#9877 Transparent Polyester, 0.114 mm Double Coated Medical Tape" from 3M Company), was applied so that the high peel strength side was attached to the lens block prepared as described above and the low peel strength side was attached to the same four types of lenses described in Run 1.

The blocks were each deblocked using a Weco™ deblocker to remove the flexible block from the lens. The back side of the block was placed in a circular groove of the deblocker and a handle was pressed to squeeze the block off of the lens. The lenses and blocks were inspected to determine on which surface the tape remained, "block" or "lens", at two time intervals: immediately (0 to 30 minutes) and after 3 days. The results were recorded in Table 1.

TABLE 1

| Run Number | Tape Type (Block/Lens) | Contact Time | Lens Type | | | |
|---|---|---|---|---|---|---|
| | | | Glass | CR-39 | Poly-carbonate | Supersin ™ |
| 1 | #9425 | 0–30 min | Block | Block | Block | Block |
| | | 3 days | Block | Block | Block | Block |
| 2 | 950/9874 | 0–30 min | Block | Block | Block | Block |
| | | 3 days | Block | Block | Block | Block |
| 3 | 950/2550 | 0–30 min | Block | Block | Block | Block |
| | | 3 days | Block | Block | Block | Block |
| 4 | 1920/2550 | 0–30 min | Block | Block | Block | Block |
| | | 3 days | Block | Block | Block | Block |
| 5 | #9874 | 0–30 min | Lens | Lens | Lens | Lens |
| | | 3 days | — | — | — | — |
| 6 | #665 | 0–30 min | Lens | Lens | Block | Lens |
| | | 3 days | — | — | Block | — |
| 7 | #9877 | 0–30 min | Lens | Lens | Lens | Lens |
| | | 3 days | — | — | — | — |

Example 2

Compliant lens blocks were injection molded from a thermoplastic ionomer resin made of a copolymer of polyethylene and methacrylic acid neutralized with zinc (commercially available as "Surlyn 1702" from E. I. Du Pont de Nemours, Inc., Wilmington, Del.), at a temperature of approximately 200° C. Runs 8, 9, 10, 11, 12, 13, and 14 were prepared and evaluated as described in Runs 1, 2, 3, 4, 5, 6, and 7 respectively using the block described above. The results are reported in Table 2.

TABLE 2

| Run Number | Tape Type (Block/Lens) | Contact Time | Lens Type | | | |
|---|---|---|---|---|---|---|
| | | | Glass | CR-39 | Poly-carbonate | Supersin ™ |
| 8 | #9425 | 0–30 min. | Block | Block | Block | Block |
| | | 3 days | Block | Block | Block | Block |
| 9 | 950/9874 | 0–30 min. | Block | Block | Block | Block |
| | | 3 days | Block | Block | Block | Block |
| 10 | 950/2550 | 0–30 min. | Block | Block | Block | Block |
| | | 3 days | Block | Block | Block | Block |
| 11 | 1920/2550 | 0–30 min. | Block | Block | Block | Block |
| | | 3 days | Block | Block | Block | Block |
| 12 | #9874 | 0–30 min. | Lens | Lens | Lens | Block |
| | | 3 days | — | — | — | — |
| 13 | #665 | 0–30 min. | Lens | Block | Block | Block |
| | | 3 days | — | Lens | Lens | Lens |
| 14 | #9877 | 0–30 min. | Lens | Lens | Lens | — |
| | | 3 days | — | — | — | — |

Example 3

Compliant lens blocks were injection molded from a thermoplastic ionomer resin made of a copolymer of polyethylene and methacrylic acid neutralized with zinc (commercially available as "Surlyn 9450" from E. I. Du Pont de Nemours, Inc., Wilmington, Del.), at a temperature of approximately 200° C. Runs 15, 16, 17, 18, 19, 20, and 21 were prepared and evaluated as described in Runs 1, 2, 3, 4, 5, 6, and 7 respectively using the block described above. The results are reported in Table 3.

TABLE 3

| Run No. | Tape Type (Block/ Lens) | Contact Time | Lens Type | | | |
|---|---|---|---|---|---|---|
| | | | Glass | CR-39 | Poly-carbonate | Supersin ™ |
| 15 | #9425 | 0–30 min. | Block | Block | Block | Block |
| | | 3 days | Block | Block | Block | Block |
| 16 | 950/ 9874 | 0–30 min. | Block | Block | Block | Block |
| | | 3 days | Block | Block | Block | Block |
| 17 | 950/ 2550 | 0–30 min. | Block | Block | Block | Block |
| | | 3 days | Block | Block | Block | Block |
| 18 | 1920/ 2550 | 0–30 min. | Block | Block | Block | Block |
| | | 3 days | Block | Block | Block | Block |
| 19 | #9874 | 0–30 min. | Lens | Lens | Lens | Block |
| | | 3 days | — | — | — | — |
| 20 | #665 | 0–30 min. | Lens | Block | Block | Block |
| | | 3 days | — | Lens | Lens | Block |
| 21 | #9877 | 0–30 min. | Lens | Lens | Lens | Lens |
| | | 3 days | — | — | — | — |

Example 4

Peel Adhesion of Pressure-Sensitive Tape

The tapes used to adhere the lens to the lens block for Runs 8, 11, 12, 13, and 14 of Example 2 were evaluated for peel adhesion using a modification of ASTM D 3330M-87 "Standard Test Methods for Peel Adhesion of Pressure-Sensitive Tape at 180° Angle [Metric]" Method A. A peel rate of 31.75 centimeters per minute was employed. A tension tester, (IMASS Slip/Peel Tester, Model 3M90, commercially available from Instrumentors, Inc., Strongsville, Ohio) was used to measure the Peel Adhesion Value (PAV). The low peel strength side of the tapes were adhered to the lens types described in Run 1 and individually tested. In addition, a 0.1 millimeter "Surlyn 1702" film from E. I. Du Pont de Nemours, Inc. was adhered to a glass plate using "Scotch™ brand Wallsaver™ mounting tape" (commercially available from 3M Company, St. Paul, Minn.). The high peel strength side of the tapes was then adhered to the film. The high peel strength side of the tapes was then peeled from the film and the average peel force in Newtons per millimeter was recorded. The results are shown in Table 4. The Differential Peel Adhesion Value equals the difference between the Peel Adhesion Value for the tape from the lens block film minus the highest average Peel Adhesion Value for the tape from the lens type.

TABLE 4

| | | Lens Types | | | | Block Type | Differential Peel Adhesion | Differential Peel Ratio |
|---|---|---|---|---|---|---|---|---|
| Run No. | Tape Type (Block/Lens) | Glass (N/mm) | CR-39 (N/mm) | Polycarbonate (N/mm) | Supersin ™ (N/mm) | Surlyn 1702 (N/mm) | Value (N/mm) | (avg. for all lenses) |
| 8 | #9425 | 0.175 | 0.197 | 0.208 | — | 0.393 | 0.185 | 2.0 |
| 11 | 1920/ 2550 | 0.164 | 0.109 | 0.196 | — | 0.379 | 0.183 | 2.4 |
| 12 | #9874 | 0.171 | 0.214 | 0.184 | 0.135 | 0.252 | 0.038 | 1.4 |
| 13 | #665 | 0.164 | 0.84 | 0.257 | 0.090 | 0.355 | 0.071 | 1.7 |
| 14 | #9877 | 1.070 | 0.942 | 1.067 | 0.772 | 0.930 | −0.140 | 0.9 |

For Runs 8 and 11 the tape remained with the block after deblocking as desired; while in Runs 12, 13, and 14 the tape generally remained with the lens which is not desirable. The differential peel forces help to explain the results of deblocking. That is, the greater the differential peel force between the lens and the block the more likely the result of the tape remaining with the block.

Various modifications and alterations of this invention will be apparent to those skilled in the art without departing from the scope and spirit of this invention, and it should be understood that this invention is not limited to the illustrative embodiments set forth herein.

What is claimed is:

1. A block assembly for mounting an optical lens blank onto a lens processing machine, comprising:

a base structure comprising a compliant receiving surface adapted to conform to a surface of an optical lens blank to be processed in a lens processing machine and a mounting means for mounting said block onto a chuck of a processing machine; and an adhesive tape having a combined thickness of less than 0.38 mm and comprising a first adhesive surface and a second adhesive surface, said compliant receiving surface and said adhesive tape being constructed of material such that when said first adhesive surface of said tape is adhered to said compliant receiving surface and said second adhesive surface of said tape is adhered to an allyl diglycol carbonate lens blank, said first adhesive surface adheres more tenaciously to said compliant receiving surface then said second adhesive surface adheres to the allyl diglycol carbonate lens blank.

2. A block assembly according to claim 1, wherein said optical lens blank has a cylindrical axis and said adhesive tape is optically transparent so as to enable the visual or photometric alignment of said block with the cylindrical axis of said optical lens blank.

3. A block assembly according to claim 1, wherein said adhesive tape comprises a backing having a first major surface and a second major surface, each of said major surfaces being coated with a pressure sensitive adhesive.

4. A block assembly according to claim 3 wherein each major surface of said backing is coated with a different pressure sensitive adhesive.

5. A block assembly according to claim 3, wherein said backing is selected from the group consisting of polyethylene, polyester, polypropylene, polyurethane, poly(vinyl acetate), and poly(vinyl alcohol).

6. A block assembly according to claim 3, wherein each side of the backing is coated with a different weight or pattern of the pressure sensitive adhesive.

7. A block assembly according to claim 1, wherein said adhesive tape has a thickness of less than 0.25 mm.

8. A block assembly according to claim 7, wherein said block assembly exhibits shear displacement of less than 2° measured by mounting a 50.8 mm radius lens blank to said lens block and applying a 2.73 kg force tangentially at the edge of the lens while firmly holding said block in a fixed position.

9. A block assembly according to claim 7, wherein said adhesive tape comprises a backing having a first major surface and a second major surface, each of said major surfaces being coated with between 3 and 80 grams/m$^2$ of a pressure sensitive adhesive.

10. A block assembly according to claim 1, wherein said adhesive tape has a thickness of less than 0.13 mm.

11. A block assembly according to claim 1, wherein said adhesive tape provides a peel strength to said lens of at least 0.15 N/mm width and said tape provides a differential adhesion ratio of at least 1.75.

12. A block assembly according to claim 1, wherein said base structure comprises a thermoplastic material selected from the group consisting of high impact polyethylene, high impact polypropylene, block copolymers of styrene-ethylene/butylene-styrene, and copolymers of polyethylene and methacrylic acid.

13. A block assembly according to claim 1, wherein the second adhesive surface of the adhesive tape is covered with a release liner prior to use and the first adhesive surface of the adhesive tape is applied to the compliant receiving surface of the base structure.

14. A block assembly according to claim 1, wherein the assembly further comprises an optical lens blank, the first adhesive surface of the adhesive tape being covered with a release liner prior to use and the second adhesive surface of the adhesive tape being applied to the optical lens blank.

15. A block assembly according to claim 14, wherein the adhesive tape comprises a backing which is coated on both major surfaces with between 7 and 35 grams/m$^2$ of a pressure sensitive adhesive.

16. A block assembly according to claim 14, wherein the base structure comprises a thermoplastic material selected from the group consisting of high impact polyethylene, and high impact polypropylene.

17. A block assembly according to claim 14, wherein said block assembly exhibits shear displacement of less than 1° measured by mounting a 50.8 mm radius lens blank to said lens block and applying a 2.73 kg force tangentially at the edge of the lens while firmly holding said block in a fixed position.

18. A block assembly according to claim 1, wherein the adhesive tape has a thickness of less than 0.08 mm.

19. A block assembly according to claim 1, wherein the adhesive tape consists essentially of a single layer of pressure sensitive adhesive.

20. A block assembly for mounting an optical lens blank onto a lens processing machine, comprising:

a base structure comprising a compliant receiving surface adapted to conform to a surface on an optical lens blank to be processed in a lens processing machine and a mounting means for mounting said block onto a chuck of a lens processing machine; and an adhesive tape having a combined thickness of less than 0.13 mm and a comprising a backing which is coated on both major surfaces with between 3 and 50 grams/m$^2$ of a pressure sensitive adhesive, said compliant receiving surface and said adhesive tape being constructed of material such that when said first adhesive surface of said tape is adhered to said compliant receiving surface and said second adhesive surface of said tape is adhered to an allyl diglycol carbonate lens blank, said first adhesive surface adheres more tenaciously to said compliant receiving surface than said second adhesive surface adheres to the allyl diglycol carbonate lens blank, and wherein said adhesive tape provides a peel strength to the allyl diglycol carbonate lens blank of at least 0.15 N/mm width and said tape provides a differential adhesion ratio of at least 1.75.

* * * * *